United States Patent
Funderburg et al.

(10) Patent No.: US 9,116,648 B1
(45) Date of Patent: Aug. 25, 2015

(54) METHOD FOR AUTOMATIC PHOTO ALBUM LAYOUT AND PRINTING

(71) Applicants: Andrew Michael Funderburg, Beaverton, OR (US); Jonathan David Stickles, Beaverton, OR (US); Paolo Hilario, Beaverton, OR (US)

(72) Inventors: Andrew Michael Funderburg, Beaverton, OR (US); Jonathan David Stickles, Beaverton, OR (US); Paolo Hilario, Beaverton, OR (US)

(73) Assignee: Fundy Software Inc., Beaverton, OR (US)

(*) Notice: Subject to any disclaimer, the term of this patent is extended or adjusted under 35 U.S.C. 154(b) by 0 days.

(21) Appl. No.: 14/289,312

(22) Filed: May 28, 2014

(51) Int. Cl.
*G06F 3/12* (2006.01)
*G06K 15/02* (2006.01)
*G06T 11/60* (2006.01)

(52) U.S. Cl.
CPC ............ *G06F 3/1242* (2013.01); *G06F 3/1204* (2013.01); *G06F 3/1208* (2013.01); *G06F 3/1254* (2013.01); *G06F 3/1256* (2013.01); *G06K 15/1843* (2013.01); *G06K 15/1868* (2013.01); *G06K 15/1885* (2013.01); *G06K 15/1889* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 7,743,322 B2 * | 6/2010 | Atkins | ............................ | 715/243 |
| 8,013,874 B2 * | 9/2011 | Reid et al. | ...................... | 345/660 |
| 2002/0040375 A1 * | 4/2002 | Simon et al. | ................... | 707/517 |

* cited by examiner

*Primary Examiner* — Paul F Payer
(74) *Attorney, Agent, or Firm* — Mersenne Law

(57) ABSTRACT

Automatic photo-album layout methods create printed pages by assigning each image in an ordered series of images to a position on one of several rows (or positions in one of several columns). Images in each row (or each column) are scaled so that the widths of the rows (or the heights of the columns) are equal, while the heights of the rows (or the widths of the columns) are unequal. The rows or columns form a rectangle, which is centered in a rectangular drop zone, and a physical page is printed containing the array of images as arranged and scaled. Other transformations may be applied to the images, the rows or columns, or the array of images in the drop zone prior to printing.

14 Claims, 8 Drawing Sheets

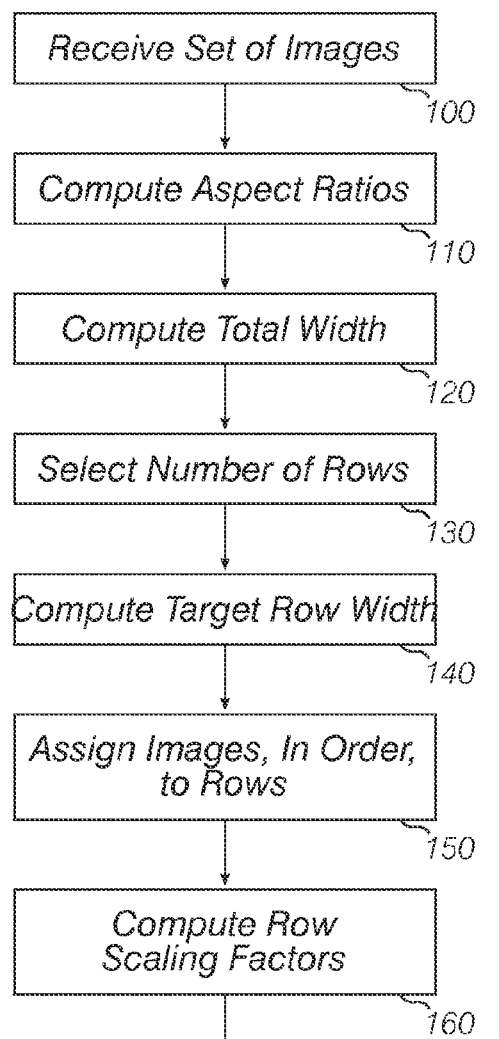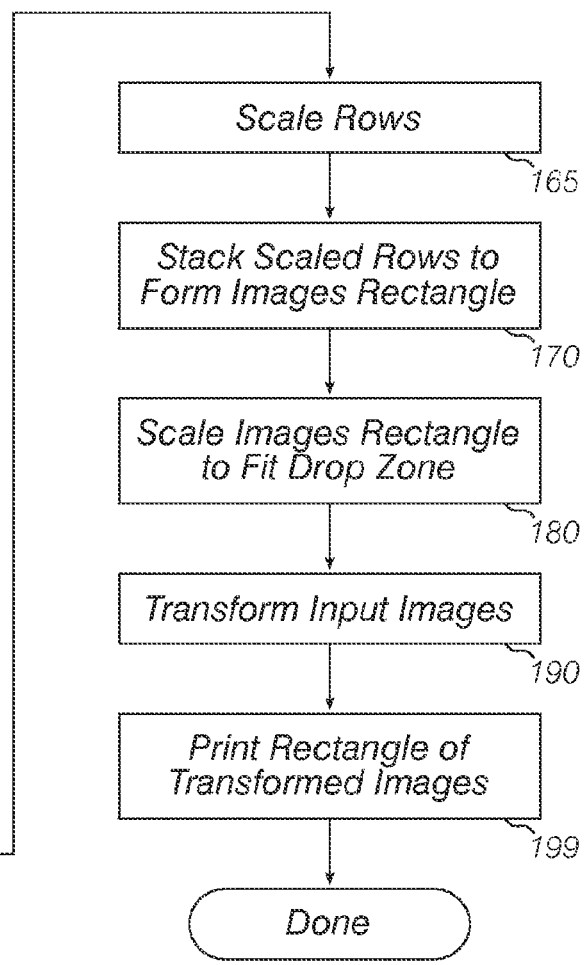
Fig. 1

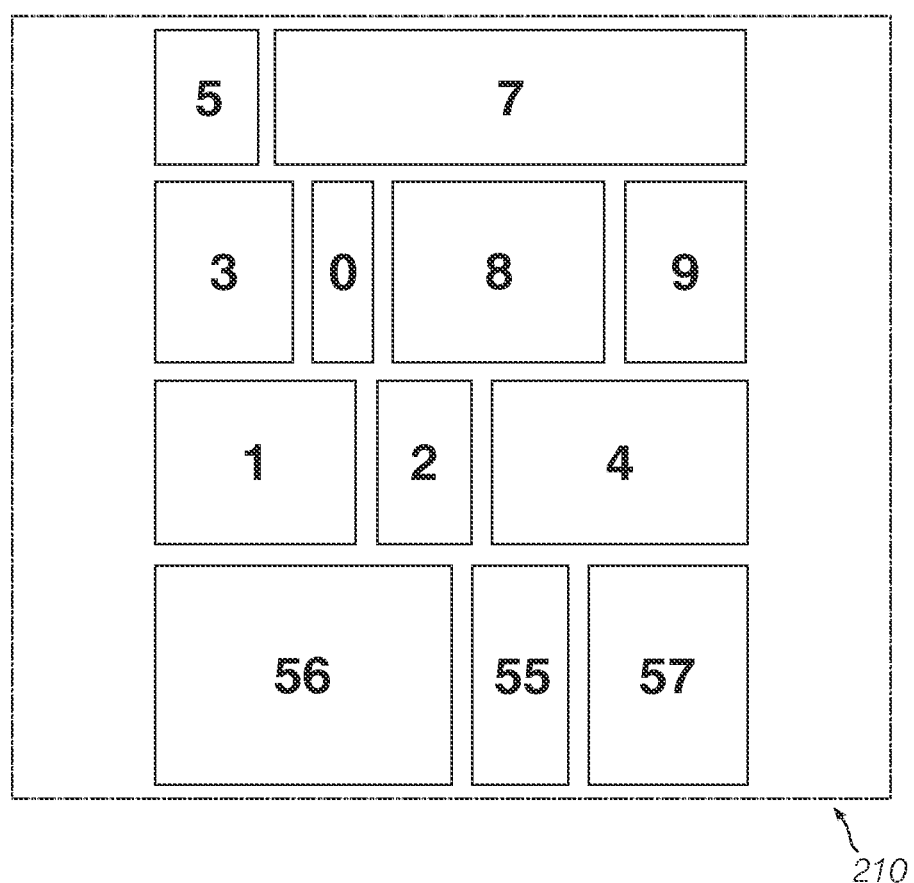

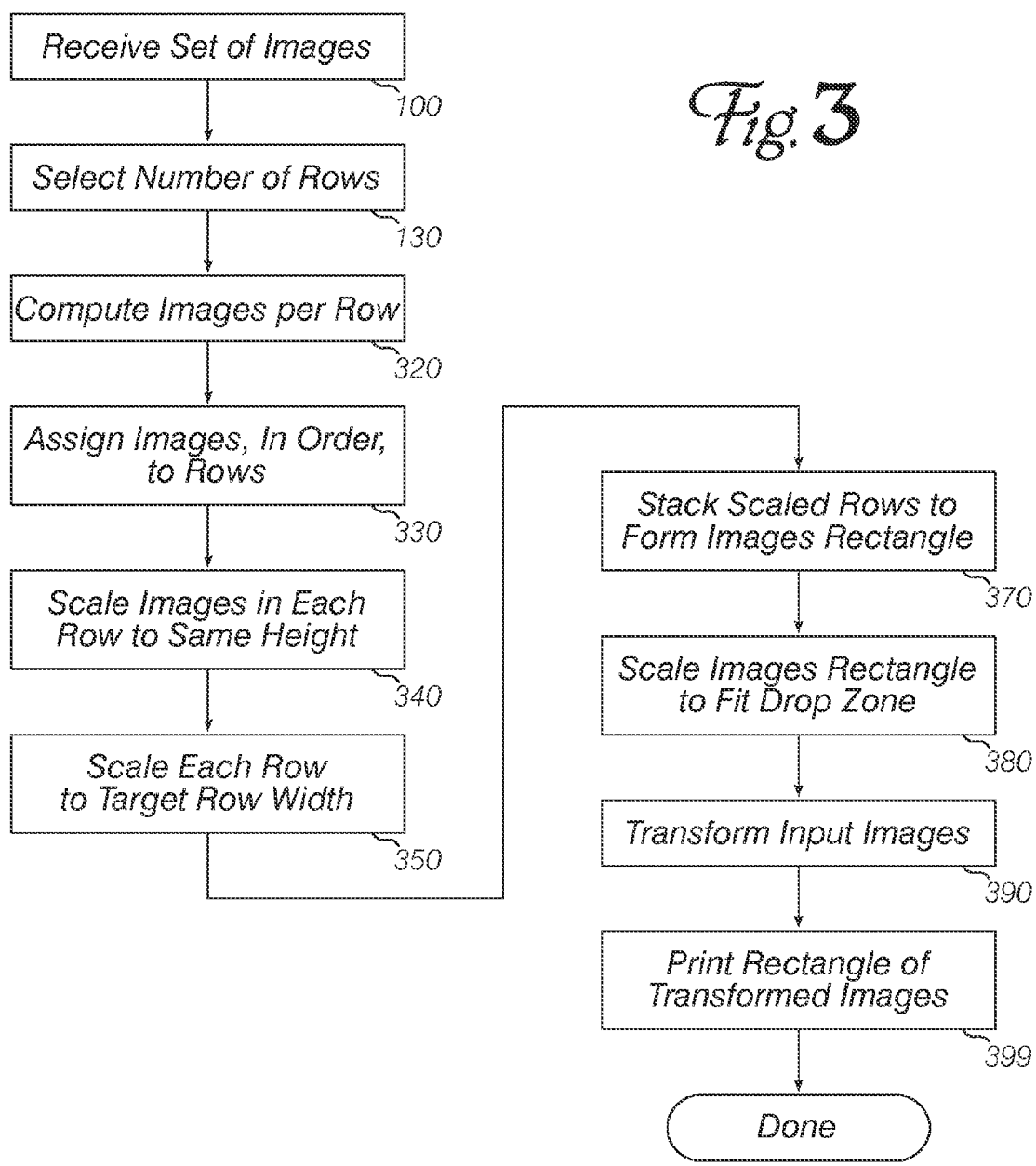

ly high-

METHOD FOR AUTOMATIC PHOTO ALBUM LAYOUT AND PRINTING

CONTINUITY AND CLAIM OF PRIORITY

This is an original U.S. patent application.

FIELD

The invention relates to prepress design and layout. More specifically, the invention relates to automatic methods for laying out a series of heterogeneous rectangular images into a rectangular space for printing.

BACKGROUND

In the past, photo albums and picture books were the product of a labor-intensive series of manual manipulations of physical objects: a photographer would capture images onto film; the film would be developed to produce negatives; the negatives would be printed onto paper; and the paper photos would be arranged onto a page for delivery or for further operations leading to printing (e.g., offset printing) of multiple copies of the page. The process would often include cropping or resizing of photos to obtain an attractive, balanced composition, and for low-volume production, layout often involved cropping or resizing to match pre-cut windows in a mat board (rather than cutting custom mats to suit an arbitrary layout of ideally-cropped and -sized images on the page). Thus, in addition to the involved manual process, the result was often constrained by the number and configuration of pre-cut mats: a designer laying out three images on a page might have only two or three different options for photo position, size and aspect ratio. (The alternative of cutting arbitrary custom mats for each page is prohibitively expensive for many projects.)

With the development of digital photography and high-bandwidth data connections among devices (such as via the Internet), photos are now more commonly shared one at a time or in an array or slide show on a transient display device such as a multi-pixel screen (e.g., an LCD monitor, a laptop screen, a tablet device or an electronic picture frame), and/or via other impermanent distribution mechanisms such as website galleries. However, consumers still desire permanent physical copies of some photo sets, such as wedding albums, graduation pictures and childhood memories books. And although many of the photos in such physical albums are often created through a digital process, the facilities for laying out the photos into printable spreads still emulate the traditional "template" model, where the designer must select from among a small number of arrangements and photo sizes matching the number of photos to be displayed on the page. (Or alternatively, the creator of the photo layout software must produce an enormous number of templates with different layouts, sizes and aspect ratios for each number of photos on a page, and the designer must be familiar with the many templates to achieve the desired effect.) Either way, simply replicating traditional paper-based photo layout procedures into software does not take advantage of the flexibility and power that computer-based layout could offer, and does not yield the labor (and cost) savings that might be expected.

An automated, parametric photo layout method can offer significant advantages over traditional paper-based procedures and over software procedures that merely mimic the traditional methods.

SUMMARY

Embodiments of the invention automatically arrange, scale and lay out sets of rectangular images having varying aspect ratios into a pleasing array, which is composited onto a page in preparation for printing. A number of optional transformations may also be applied to the images or to the layout process, and information to create custom mats via, for example, a computer-numerically-controlled ("CNC") cutter can also be provided, allowing the economical production of fully-custom matted photo books, even in small volume.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 1 is a flow chart outlining the central operations according to an embodiment.

FIGS. 2A-E show how an embodiment operates on a set of non-uniform images.

FIG. 3 is a flow chart outlining the central operations of another embodiment.

DETAILED DESCRIPTION

Embodiments of the invention deal principally with two-dimensional rectangular images. Images of other shapes can also be accommodated, but such images are usually treated as if they were rectangles having width and height equal to their maximum horizontal and vertical dimensions, respectively. In the following disclosure, "width" and "height" will be used to denote dimensions in orthogonal directions, and directional words such as "up," "down," "right," "left," "horizontal" and "vertical" will be used in their ordinary senses relative to locations and directions on a two-dimensional coordinate system. Similarly, a "row" is a series of images or positions laid out side by side, horizontally, from left to right across a page; and a "column" is a series of images or positions laid out one below another, vertically, from top to bottom. It is appreciated that the methods described here can be performed with horizontal and vertical dimensions exchanged, which is essentially equivalent to rotating the coordinate system 90°, or turning a sheet of paper from portrait to landscape orientation. Also, rows and columns can be laid out from right to left or from bottom to top without taxing the capacities of one of ordinary skill.

Images are understood to be two-dimensional arrays of pixels, each pixel having visual characteristics such as hue, lightness, saturation, and transparency, but these visual characteristics are only relevant to the final printed page; the layout procedures operate only on the pixel dimensions and quantities computable therefrom. Pixel dimensions are positive integers, but embodiments preferably operate mostly in the realm of real numbers. After calculating real-valued "ideal" positions and scaling factors, the images are scaled and moved to the nearest integer-valued pixel sizes and positions. It is preferred that the input images be sufficiently high in resolution that they can be scaled without introducing unattractive visual artifacts. Although the resolutions at which most embodiments operate (at least 300 clots per inch, and preferably 1,000 clots per inch or more) are quite high, precautions are taken to avoid even single-pixel discrepancies between intended and actual widths and heights.

FIG. 1 is a flow chart outlining a central portion of a method according to an embodiment of the invention. The method is preferably performed by a programmable processor (i.e., a computer), executing instructions to cause the processor to perform the operations described. FIGS. 2A-E depict graphically the inputs, intermediate stages, and results of performing the method.

Figure 2A:
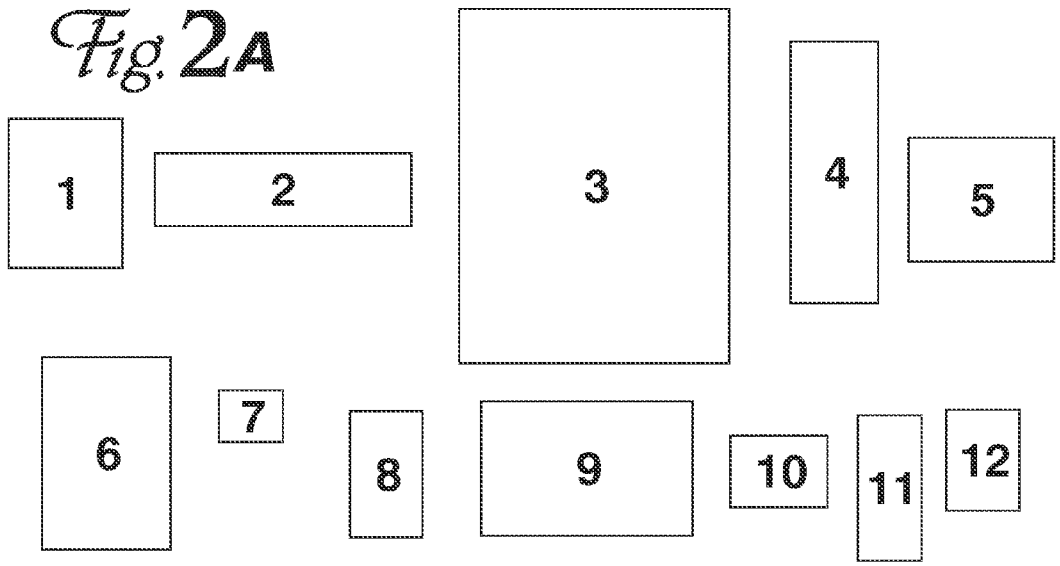
Figure 2B:
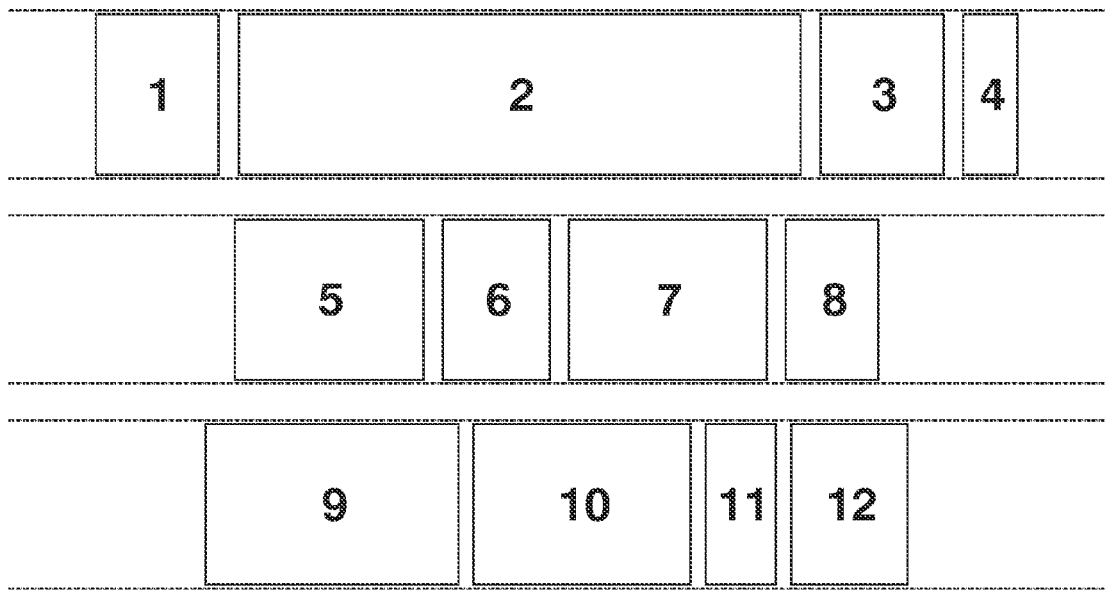

To begin, an embodiment receives (obtains, is given) a set of two-dimensional raster images, each containing an array of pixels (100). The images are usually provided in a particular order (first to last), but some embodiments may impose an order on an unordered set, and others may be extended to re-order the set (e.g., reversing the order, rotating the order by moving some images from the front of the list to the end, or completely shuffling the order). FIG. 2A shows an ordered set of rectangles representing the images. For simplicity and ease of description, each representative image bears its order number, rather than an actual graphic image. Note that the images are of various sizes and proportions.

Next, the aspect ratio of each image is computed as the pixel width divided by the pixel height (110). Aspect ratios are preferably treated as real numbers, notwithstanding that the pixel dimensions are integers. Subsequent calculations and operations use the real-valued aspect ratios and related quantities. This approach allows an embodiment to deal with images of different sizes and different resolutions efficiently. The aspect ratio is a single number (per image) that encodes or represents enough information about the image to perform the subsequent steps. Converting images to aspect ratios can be thought of conceptually as unifying the images' heights (FIG. 2B); after converting to aspect ratios, images 1 and 3 (which were originally differently-sized, but of similar proportions) are represented by similar-sized and -proportioned rectangles. Image 2, a wide "landscape" image, has an aspect ratio greater than 1.0, and so consumes more horizontal space than image 4, which is a tall, thin image with an aspect ratio less than 1.0. The aspect ratio represents the width of each image if all were scaled to the same height.

The total width of the images is computed as the sum of all of the aspect ratios (120); a number of image rows is selected (130); and a target row width is computed as the total image width divided by the number of image rows (140). Most uses of an embodiment will work best with three to ten image rows, although the method functions deterministically with row numbers between one and the number of images to be laid out.

Figure 2C:
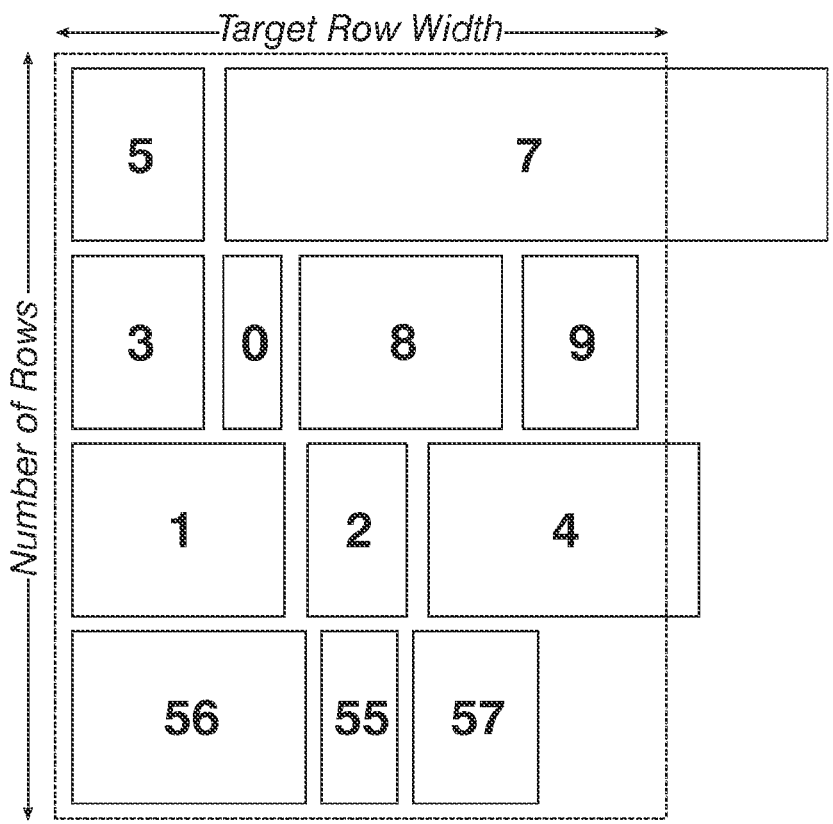

Now, proceeding in row order, images from the set are assigned to positions across the row until each row has images, the sum of whose widths are near the target row width (150). Row boundaries may be adjusted backward and forward to find the row assignments that give the smallest total discrepancy between actual row widths and the target row width. FIG. 2c shows a four-row layout with slight overfilling of the first and third rows, and slight underfilling of the second and fourth rows.

Figure 2D:
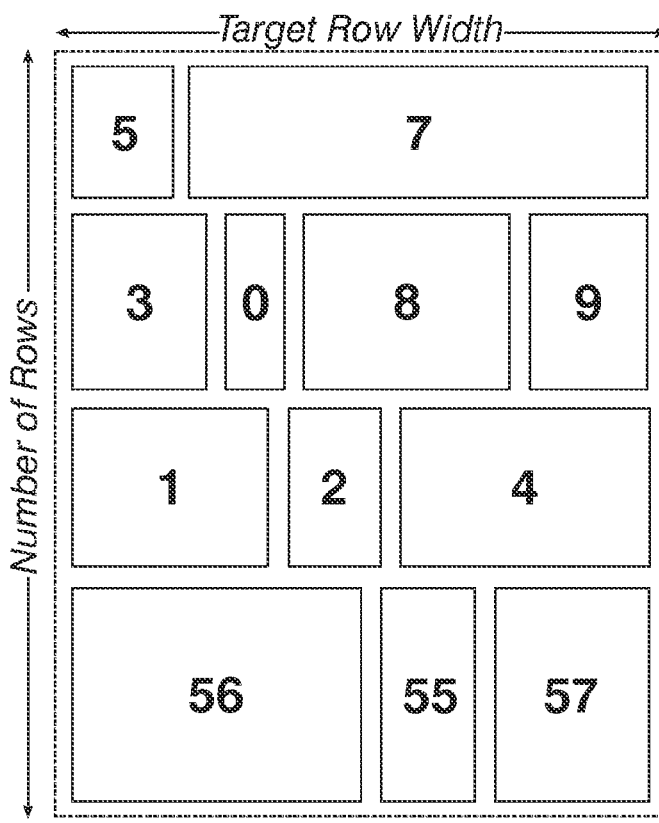

For each row, a scaling factor is computed that adjusts the sum of the width of the images in the row to be exactly the target row width (160). For example, if the target row width is 4 and the sum of aspect ratios of the row is 5, then the row is shrunk by 20% so that its width is 4 and its height is 80% of its pre-scaling height (FIG. 2D). Scaling the rows by this factor (165) results in a plurality of rows of identical width, but (usually) different heights. FIG. 2D shows the result of this scaling for the example set of images.

The rows of unified width are stacked vertically in a column to form a rectangle of images (170) whose width is the target row width and whose height is the sum of the scaled row heights.

Finally, the rectangle of images is scaled to fill a "drop zone"—a target rectangle on a layout that is desired to be filled with scaled and arranged images from the original set (180). The aspect ratio of the rectangle of images may be different from that of the drop zone; if so, scaling is done so that one of the width or the height of the rectangle of images matches the corresponding width or height of the drop zone, and the other dimension is smaller than the corresponding drop-zone dimension. The scaled rectangle of images is centered within the drop zone, filling it in one direction and centered in the other direction. FIG. 2E shows a drop zone 210 which is slightly wider than the natural aspect ratio of the rectangle of images. Therefore, when the rectangle is scaled to fit the drop zone height, the image rectangle is narrower than the drop zone. The images are centered horizontally in the drop zone.

Finally, the original images are transformed by scaling and positioning as determined through the foregoing operations (190), and the rectangle of transformed images is printed on a physical medium such as an album sheet (199).

The upshot of this procedure is that a designer can create a photo album with rapid, flexible, automatic layout by defining drop zones on suitable page-sized areas, choosing a number of rows for each drop zone, and providing series or sets of images from which to fill the drop zones. In fact, an embodiment may be organized similarly to the prior-art "one image per window" templates, but each template window is replaced with a drop zone that can accept and automatically lay out a plurality of images. Because the layout of a page depends on all of the aspect ratio of the drop zone, the number of rows, and the number and aspect ratios of the images, a single template page (even one with only a single drop zone) can produce a wide range of photo layouts.

FIG. 3 shows an alternate procedure that can achieve similar results for image layout. As before, a set of images is obtained (100), and the user selects the desired number of rows (130). Now, the number of images per row is computed as the quotient of the number of images and the number of rows, rounded up (320). Next, the images are assigned in order to positions on each row (330), much like dealing out playing cards from a deck. Each row has the same number of images (except the last row, which may have fewer images if the total number of images is not evenly divisible by the number of rows).

The images in each row are scaled to a uniform height (340), and then the whole row is scaled so that the total row width matches the target width (350). (The target width may be the width of the drop zone.) After these two scaling steps, all the rows will be the same width, but they will usually be of differing heights. Then, continuing as before, the scaled rows are stacked to form a rectangle of images (370), and the rectangle is scaled to fit into the drop zone (380).

The original images are scaled and positioned (390), and then the page containing the transformed images is printed (399).

This alternate method may produce less visually-balanced results, but it improves the predictability of image ordering: images will never move from the end of one row to the beginning of the next (or vice versa) as the drop zone aspect ratio is changed, and image additions, swaps and substitutions will behave more predictably.

Figure 4:
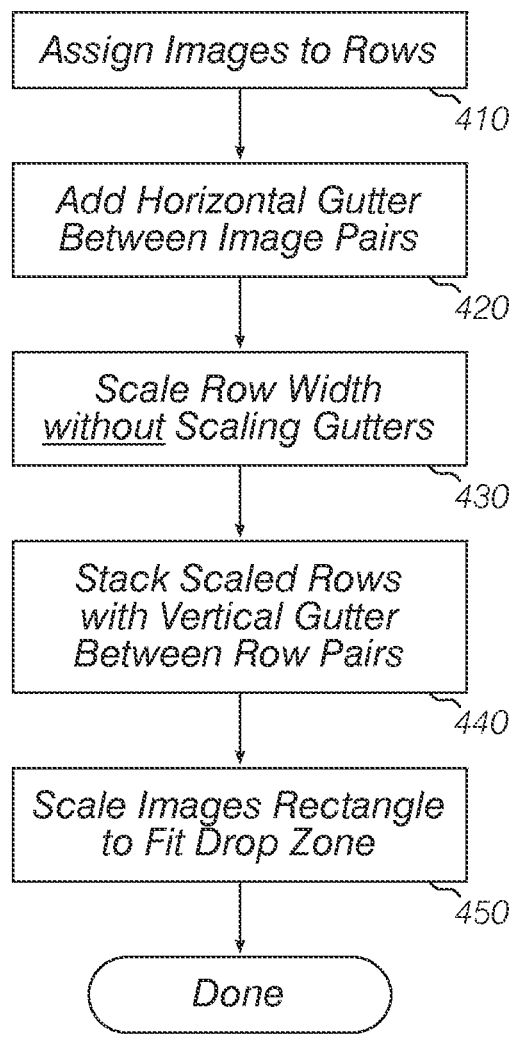
FIG. 4 is a flow chart explaining how to modify an embodiment to place gaps or margins between images in an automatic layout.

Note that the procedures outlined in the flow charts of FIGS. 1 and 3 calculate positions and scalings with the images laid out edge to edge, without overlaps or gaps. FIGS. 2A-E are slightly inaccurate in that they show gaps between adjacent images so that it is easier to perceive the individual image boundaries. However, it is appreciated that actual photo album layouts are often more aesthetically pleasing if borders or gaps are intentionally placed between images. FIG. 4 outlines a modification to the basic methods that accounts for such gaps.

To add borders between the images laid out in a drop zone, after assigning images to rows (410), an embodiment adds horizontal gap or "gutter" widths between pairs of images (420). Each gutter width is preferably the same (i.e., the space between each image and its neighbor is the same, regardless of the images' possibly-different sizes and/or aspect ratios). Note that a row with many tall, thin images will have more gutter widths added than a row with only a few (or only one) wide image. A row with only one image would not have any horizontal gaps added at all, since gaps are added between pairs of images on a row.

Next, the appropriate row-width scaling operation is performed to make the row width equal to the target row width. However, the gutters are not scaled—they remain the same width despite adjustments to their neighboring images (430). As in the gapless embodiments, scaling the row width causes the row height to become taller or shorter.

The scaled rows of uniform width are stacked vertically (440), but vertical gutters or gaps are inserted between each pair of rows. An embodiment may use the same vertical and horizontal gaps, or different gaps in each direction. As a result of the stacking operation, a rectangular array of images is formed, where each image is separated from its horizontal neighbor(s) by a horizontal gutter or gap; and separated from its vertical neighbor(s) by a vertical gutter or gap.

Finally, the rectangular array of images is scaled to match at least one dimension of the drop zone (450). This scaling step does not affect any gap width either. The laid out, scaled array of images can be processed through the remaining operations of a method to produce an album page with equal-width borders, gaps or margins between each pair of images.

Some of the information computed through the performance of one of the foregoing methods can also be formatted and used to control a computer-numerically-controlled cutter, which can produce a custom mat for the page of laid-out images. For example, the locations and aspect ratios of the image borders may be enlarged by a predetermined amount (i.e., a fixed distance or number of pixels) and the enlarged border locations exported in a CNC control-code form (e.g., G-code) to control a machine to cut openings in a sheet of mat board, resulting in a custom mat with windows for each image. This custom mat is similar to the traditional one-image-per-window mat, but it can be manufactured specifically to match the automatically-generated layout.

Although the foregoing methods comprise a fair number of steps and repeated real-valued computations, most modern programmable processors can perform them quickly enough that new layouts can be calculated in real time, as a user interactively adjusts the size of a drop zone. The scaling of high-resolution images to display in a layout may take more time and result in an unsatisfactory interactive experience, so a preferred embodiment may show only the borders and locations of images in a resized drop zone until the user ceases adjusting the zone. Then, the images can be scaled and displayed for the user's review. It is appreciated that as faster processors become available, even the scaling steps may be completed quickly enough that fully interactive drop-zone resizing and review can be done (i.e., the actual images assigned to the drop-zone layout may be shown during user interaction, rather than simpler rectangular placeholders).

Alternatively, in an embodiment, one or more lower-resolution images may be computed from the source images, and these lower-resolution images may be scaled and displayed in real time as the user interactively adjusts the size or aspect ratio of a drop zone. Scaling lower-resolution images may introduce visual artifacts, but these may be tolerated during interactive layout and editing because having at least a general view of the hue, lightness and composition of the images may help the operator arrive at a pleasing layout.

An embodiment may provide additional user-interface controls to assist in guiding the automatic image layout process. In addition to the interactive resizing of drop zones, a control may be provided to interactively change the number of image rows of a drop zone; to change the gutter width between images; to change the number of images to be laid out in the drop zone; or to alter the order of the images. Preferably, all of these controls will function interactively so that their effect can be reviewed immediately on a transient image display such as an LCD monitor, laptop screen or tablet screen, and unappealing modifications can be reversed or corrected. Once an acceptable layout has been obtained, the "print" function will commit it to paper for binding into the photo album.

Figure 5:
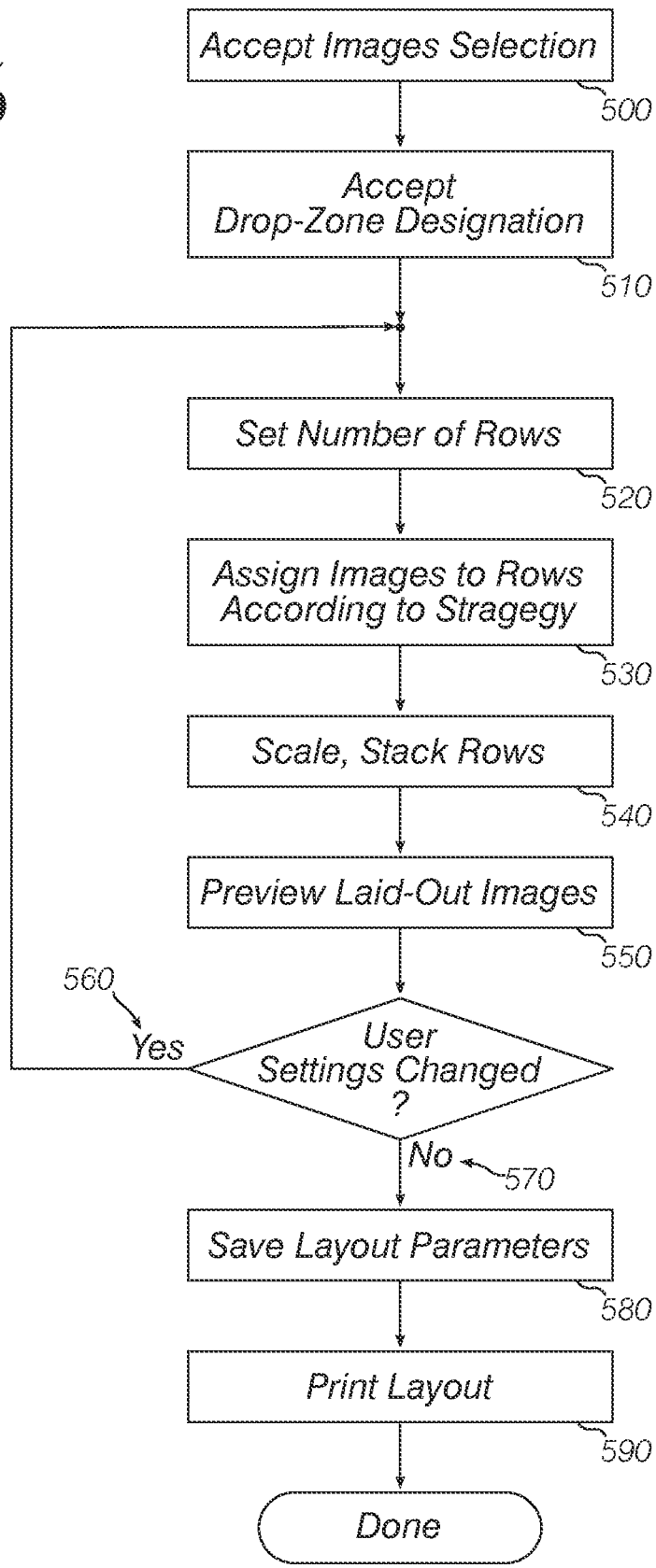
FIG. 5 is a flow chart of possible user-interface interactions associated with an embodiment of the invention.

FIG. 5 outlines a method that may be implemented as part of an interactive user interface to lay out a spread of photos onto a page for printing. The user interface provides a way for the user to select a group of images, and the selection is accepted (500). The user also selects a drop zone which is to be filled with the selected images (510). The user may also specify a number of image rows, or the embodiment may choose a suitable number (520). Since the layout calculations can be completed very rapidly, some embodiments may perform an exhaustive search of all reasonable numbers of image rows (e.g., from one to the total number of images) and automatically choose the number of rows that is "best," based on one or more criteria such as drop-zone fill percentage, uniformity of scaled row heights, simple fractionality of scaling factors (i.e., ½ or ⅔ instead of 382/1217), etc.

The selected images are assigned to rows in the drop zone according to a predetermined strategy (e.g., according to the methods outlined in FIG. 1 or FIG. 3) (530) and the rows are scaled and stacked as described previously (540). The user interface may now display the laid-out images for the user's review and approval (550). If the preview is not yet acceptable, the user may adjust one or more settings (560) and the layout process is repeated. For example, the user may re-order the selected images, add or remove images, change the number of rows, or adjust the drop zone size and/or aspect ratio. Or, in embodiments where the programmable processor automatically chooses numbers of rows, image ordering, or other parameters, the user may simply indicate that the currently-displayed layout is unacceptable, and the processor will choose the next-best layout, recalculate the image positions, and display a new preview.

If the preview is acceptable and no further user changes are entered (570), then the layout parameters corresponding to the presently-displayed preview are saved (580), and the layout is printed (590).

Figure 6:
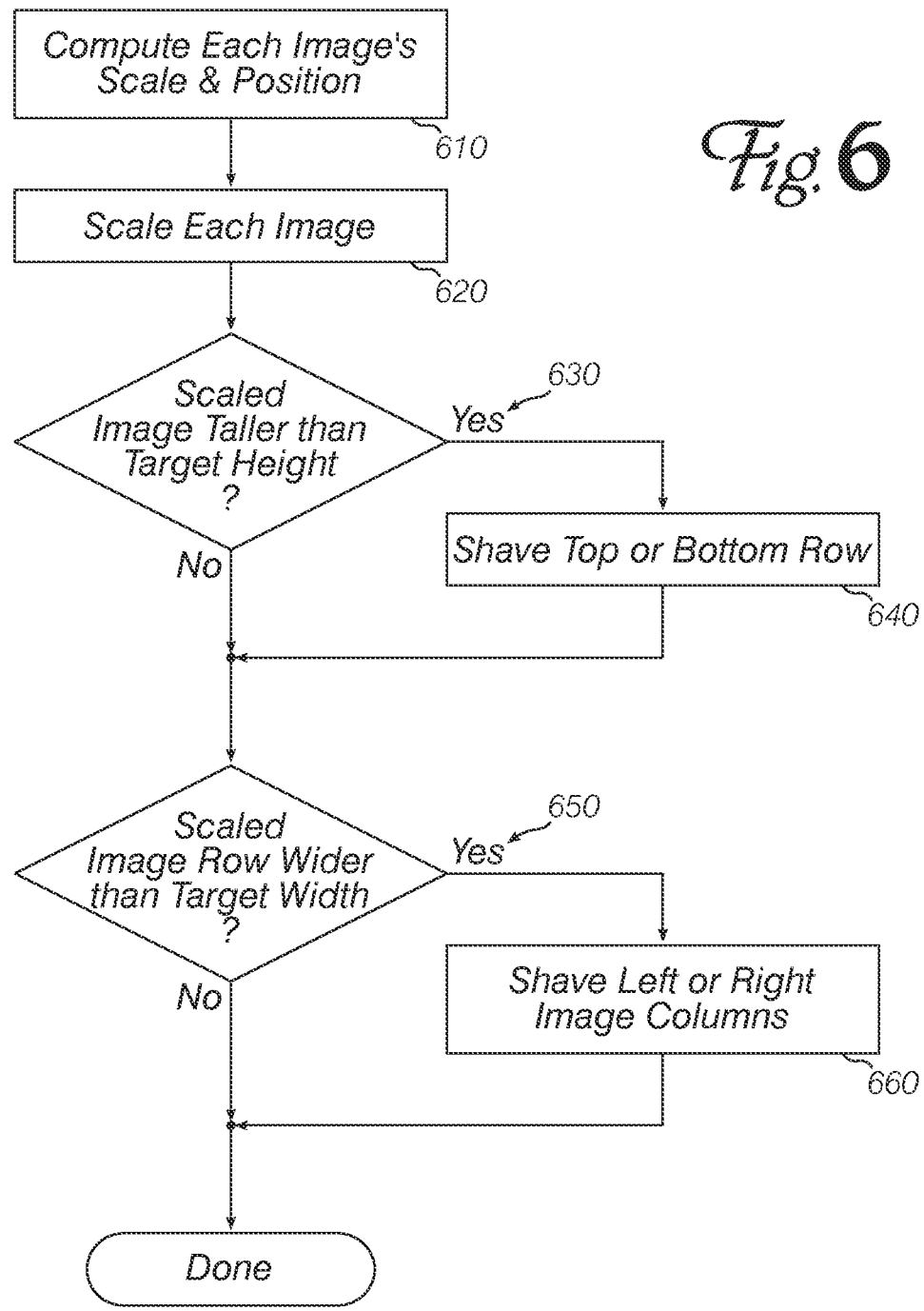
FIG. 6 is a flow chart detailing an image correction method to improve the appearance of a layout produced by an embodiment.

FIG. 6 outlines a method that may be used in some embodiments to improve the appearance of the final output arrays of images. As noted in paragraph [0015], embodiments operate with fairly- to very-high resolution images, with pixels-per-inch counts in the hundreds or thousands. Thus, a single pixel may have a printed dimension of only a few dozen or hundred micrometers. Nevertheless, the human eye is sensitive to small discrepancies that appear in an otherwise-ordered array, so it is important to avoid off-by-one (and off by a small number of) pixel errors. This can be accomplished by "shaving" images if necessary after scaling and positioning them within the rectangle of images.

Target image scale and position values are computed according to an embodiment of the invention (610). Preferably, these values are computed as real numbers. Each image is scaled according to its computed values (620). Since images comprise an integral number of pixels, rounding when scaling by a real value may cause the scaled image to be a fraction of a pixel larger than its "ideal" size.

If a scaled image is taller than the target row height (630), one of the top row of pixels or the bottom row of pixels of the image is removed (640) so that all of the images in the row have exactly the same integral pixel height.

If the sum of the scaled images' pixel widths plus any inter-image gutter widths exceeds the target row width (650), then one or more scaled images' right or left pixel columns are removed (660) so that the sum of all the images' pixel widths and any gutter widths (i.e., the total row width in pixels) is exactly the same as all other rows' widths.

Removing a top or bottom row of pixels, or a right or left column of pixels, from a scaled image is referred to as "shaving" the image. The goal of shaving is to ensure that all of the images in a row are exactly the same height, and that every row of images is exactly the same width. An embodiment may also detect images in adjacent rows whose left or right edges lie only a small, predetermined number of pixels apart from one another. These images (and/or the images on either side of them in their respective rows) may be shaved on the right or left sides so that the nearly-aligned images become, in fact, exactly aligned. Attention to this detail may provide a significant improvement in the overall perceived quality of printed output.

It is appreciated that a drop zone is a rectangular area containing image data, and so an embodiment may operate recursively by selecting a drop zone containing a plurality of images to be placed in one rectangular image space of a parent drop zone. This nesting of child drop zones within parent drop zones can be repeated to arbitrary depth, although it is believed that nestings of more than one or two levels will be of limited use because the images in more-deeply-nested drop zones will be quite small.

Although all of the foregoing discussion has focused on laying out images horizontally in rows, and then stacking the rows vertically to form a rectangle of images, it is reiterated that all of the methods could be performed with "horizontal" and "vertical" directions exchanged, so that columns of images are formed (with images of equal width), and then the columns are scaled to a uniform height. These uniform-height (but probably unequal width) columns are then arranged horizontally adjacent each other to form an image rectangle, which is itself scaled to fit into a drop zone. Embodiments of the invention may operate in either direction, and may in fact search for the "best" layout by computing results in some or all of left-to-right rows, right-to-left rows, top-to-bottom columns or bottom-to-top columns. The user may then select the layout that is most visually appealing.

An embodiment of the invention may be a machine-readable medium, including without limitation a non-transient machine-readable medium, having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In some embodiments, the instructions for a programmable processor may be treated as data and used to modulate a carrier signal, which can subsequently be sent to a remote receiver, where the signal is demodulated to recover the instructions, and the instructions are executed to implement the methods of an embodiment at the remote receiver. In the vernacular, such modulation and transmission are known as "serving" the instructions, while receiving and demodulating are often called "downloading." In other words, one embodiment "serves" (i.e., encodes and sends) the instructions of an embodiment to a client, often over a distributed data network like the Internet. The instructions thus transmitted can be saved on a hard disk or other data storage device at the receiver to create another embodiment of the invention, meeting the description of a machine-readable medium storing data and instructions to perform some of the operations discussed above. Compiling (if necessary) and executing such an embodiment at the receiver may result in the receiver performing operations according to a third embodiment.

In the preceding description, numerous details were set forth. It will be apparent, however, to one skilled in the art, that the present invention may be practiced without some of these specific details. In some instances, well-known structures and devices are shown in block diagram form, rather than in detail, in order to avoid obscuring the present invention.

Some portions of the detailed descriptions may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, including without limitation any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing computer instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will be recited in the claims below. In addition, the present invention is not described with reference to any particular programming language. It will be appreciated that a variety of programming languages may be used to implement the teachings of the invention as described herein.

The applications of the present invention have been described largely by reference to specific examples and in terms of particular allocations of functionality to certain hardware and/or software components. However, those of skill in the art will recognize that flexible automatic tiling of non-uniform images for printing can also be accomplished by software and hardware that distribute the functions of embodiments of this invention differently than herein described. Such variations and implementations are understood to be captured according to the following claims.

We claim:

1. A computer-implemented method for preparing a photo spread, comprising:
  accepting an ordered plurality of two-dimensional rectangular images, each image having a positive width in a horizontal direction and a positive height in a vertical direction orthogonal to the horizontal direction, each image thus having an aspect ratio computable as the positive width of the image divided by the positive height of the image;
  assigning a subset of the ordered plurality of images in order to each row of a plurality of rows according to an assignment strategy;
  scaling each image of an image row to a predetermined height;
  scaling each row of the plurality of rows so that a post-scaling width of a scaled row is a uniform width, said scaling to produce a plurality of scaled rows having the uniform width and at least one scaled row having a different height than at least one other scaled row;
  stacking the plurality of scaled rows vertically to form a rectangle;
  scaling the rectangle to produce a scaled rectangle whose width matches a width of a drop zone or whose height matches a height of a drop zone;
  centering the scaled rectangle in the drop zone;
  compositing a page containing the ordered plurality of two-dimensional images, each image scaled and positioned as in the scaled rectangle; and
  printing the page on a physical medium as a photo spread.

2. The computer-implemented method of claim 1, further comprising:
  computing a total width as a sum of the aspect ratios of the rectangular images, and wherein
  the assignment strategy is assigning a subset of the ordered plurality of images in order to each row of a plurality of rows so that a row width computed as a sum of the aspect ratios of the subset of the ordered plurality of images is close to the total width divided by a number of rows of the plurality of rows.

3. The computer-implemented method of claim 1, further comprising:
  computing a number of images per row as a total number of images divided by a total number of rows and rounded up to a nearest larger integer, and wherein
  the assignment strategy is to assign the number of images per row to each row except a last row, and to assign all remaining images to the last row.

4. The computer-implemented method of claim 1, further comprising:
  increasing a width of each row of the plurality of rows by a total gutter width calculated as an image gutter width multiplied by a number of images in the row minus one, said increasing to be performed after the assigning operation and before the scaling operation, said scaling operation to affect only the images of the row and not the total gutter width of the row.

5. The computer-implemented method of claim 1 wherein the ordered plurality of two-dimensional rectangular images is a first ordered plurality of two-dimensional rectangular images and the drop zone is a first drop zone, the method further comprising:
  repeating the accepting, assigning, first scaling, stacking, second scaling and centering operations for a second ordered plurality of two-dimensional rectangular images and a second drop zone to produce a second scaled rectangle whose width matches a width of the second drop zone or whose height matches a height of the second drop zone, and wherein
  the compositing operation places the second ordered plurality of two-dimensional images scaled and positioned as in the second scaled rectangle on the page with the first scaled rectangle.

6. The computer-implemented method of claim 1, further comprising:
  shaving a top row of pixels or a bottom row of pixels from an image.

7. The computer-implemented method of claim 1, further comprising:
  shaving a leftmost column of pixels or a rightmost column of pixels from an image.

8. The computer-implemented method of claim 1, further comprising:
  temporarily exchanging horizontal and vertical directions before performing the accepting, assigning, first scaling, stacking, second scaling and centering operations so that images are placed in the rectangle in adjacent, equal-height columns, all images in each column having a uniform width and at least one column having a different width than at least one other column.

9. A non-transitory computer-readable medium containing instructions and data to cause a programmable processor to perform operations comprising:

accepting a user selection of a plurality of images;
accepting a user designation of a rectangular drop zone;
setting a number of image rows in the rectangular drop zone;
assigning each image from the plurality of images to a position on one of the image rows;
scaling each image on an image row to a predetermined height;
scaling each image row to a uniform width to produce a plurality of scaled image rows;
stacking the plurality of scaled image rows to form an image rectangle;
scaling the image rectangle to produce a scaled image rectangle fitting the rectangular drop zone;
displaying a preview image of the scaled image rectangle; and
emitting the scaled image rectangle for printing.

10. The non-transitory computer-readable medium of claim 9, containing additional instructions and data to cause the programmable processor to perform operations comprising:
receiving a user indication to change a parameter, said parameter chosen from the set comprising the plurality of images, the number of image rows in the rectangular drop zone, a width of the rectangular drop zone, or a height of the rectangular drop zone; and
repeating the assigning, first scaling, second scaling, stacking third scaling and displaying operations using the changed parameter.

11. The non-transitory computer-readable medium of claim 9, containing additional instructions and data to cause the programmable processor to perform operations comprising:
shaving one of a top pixel row or a bottom pixel row from a scaled image.

12. The non-transitory computer-readable medium of claim 9, containing additional instructions and data to cause the programmable processor to perform operations comprising:
shaving one of a left pixel column or a right pixel column from a scaled image.

13. The non-transitory computer-readable medium of claim 9, containing additional instructions and data to cause the programmable processor to perform operations comprising:
inserting non-scaled gaps between horizontally-adjacent images; and
inserting non-scaled gaps between vertically-adjacent scaled image rows.

14. The non-transitory computer-readable medium of claim 13, containing additional instructions and data to cause the programmable processor to perform operations comprising:
computing locations of at least two opposing corners of each scaled image of the scaled image rectangle;
adjusting the locations of the at least two opposing corners of each scaled image; and
exporting the locations as G-code data to control a computer numerically controlled ("CNC") cutter.

* * * * *